(12) United States Patent
Nuchter et al.

(10) Patent No.: US 8,118,291 B2
(45) Date of Patent: Feb. 21, 2012

(54) WORKPIECE POSITIONING DEVICE

(75) Inventors: Elmar Nuchter, Augsburg (DE); Erich Wiessensz, Augsburg (DE); Jurgen Krass, Dasing (DE)

(73) Assignee: KUKA Roboter GmbH, Augsburg (DE)

( * ) Notice: Subject to any disclaimer, the term of this patent is extended or adjusted under 35 U.S.C. 154(b) by 982 days.

(21) Appl. No.: 11/720,584

(22) PCT Filed: Nov. 25, 2005

(86) PCT No.: PCT/EP2005/012618
§ 371 (c)(1),
(2), (4) Date: Apr. 14, 2008

(87) PCT Pub. No.: WO2006/058663
PCT Pub. Date: Jun. 8, 2006

(65) Prior Publication Data
US 2009/0102109 A1    Apr. 23, 2009

(30) Foreign Application Priority Data

Dec. 3, 2004   (DE) .................. 20 2004 018 795 U

(51) Int. Cl.
*B25B 1/22*       (2006.01)
(52) U.S. Cl. ............... 269/71; 269/9; 269/74; 269/48.1
(58) Field of Classification Search ........... 269/71, 269/9, 74, 48.1, 56, 58, 57; 29/281.1, 259, 29/260, 281.3, 282; 248/637, 678, 188.1, 248/913; 403/57, 74
See application file for complete search history.

(56) References Cited

U.S. PATENT DOCUMENTS

| 179,794 | A | * | 7/1876 | Hyde ................. 403/57 |
| 430,267 | A | * | 6/1890 | Buob ............... 278/121 |
| 1,360,382 | A | * | 11/1920 | Edwards ............ 285/302 |
| 2,783,531 | A | * | 3/1957 | Eisler ............... 269/61 |
| 3,091,484 | A | * | 5/1963 | Laupot ............ 285/153.1 |
| 3,490,798 | A | * | 1/1970 | Spyra ............... 403/77 |
| 3,888,362 | A | * | 6/1975 | Fletcher et al. ....... 414/620 |
| 4,129,280 | A | * | 12/1978 | Ruegg et al. ........ 248/183.3 |
| 4,765,531 | A |   | 8/1988 | Ricketson et al. |
| 4,838,199 | A | * | 6/1989 | Weber .............. 118/500 |
| 4,949,944 | A | * | 8/1990 | Groff, Sr. ........... 269/45 |
| 5,549,287 | A | * | 8/1996 | Loucks ............. 269/17 |
| 5,802,698 | A | * | 9/1998 | Fitzgerald et al. ....... 29/559 |
| 5,863,034 | A | * | 1/1999 | Vauter .............. 269/51 |

(Continued)

FOREIGN PATENT DOCUMENTS
DE         3509935 A1 *   9/1985
(Continued)

OTHER PUBLICATIONS

European Patent Office; Search Report in International Patent Application No. PCT/EP2005/012618 dated Mar. 29, 2006.

*Primary Examiner* — George Nguyen
(74) *Attorney, Agent, or Firm* — Wood, Herron & Evans, LLP

(57) ABSTRACT

The invention relates to a workpiece positioning device (1) comprising at least one positioning axis (35, 39) and a modular machine frame (3) on which at least one workpiece receiving element (8, 9) is arranged. At least one frame part (4, 5, 6, 7) comprises at least one frame module (15) provided, in turn, with a long carrier element (16) and at least one connection element (17, 18, 18').

15 Claims, 12 Drawing Sheets

U.S. PATENT DOCUMENTS

Figure 1:
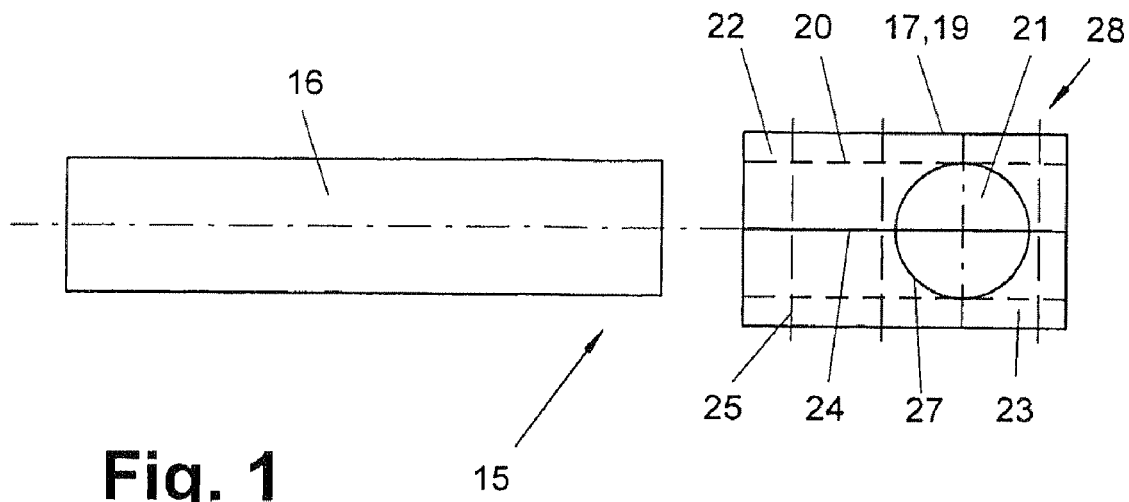

| | | | | |
|---|---|---|---|---|
| 5,918,867 A * | 7/1999 | Goodyear | | 269/71 |
| 6,874,737 B1 * | 4/2005 | Madelone | | 248/127 |
| 6,883,792 B2 * | 4/2005 | Cattell | | 269/71 |
| 6,889,968 B1 * | 5/2005 | Wong | | 269/91 |
| 7,448,606 B1 * | 11/2008 | Johnson | | 269/17 |
| 7,581,915 B1 * | 9/2009 | Bristol | | 414/11 |
| 2005/0013656 A1 * | 1/2005 | Sotiror | | 403/57 |

FOREIGN PATENT DOCUMENTS

| | | |
|---|---|---|
| DE | 41 15 656 A1 | 11/1992 |
| EP | 0 507 033 A1 | 10/1992 |
| EP | 1 207 023 A1 | 5/2002 |

* cited by examiner

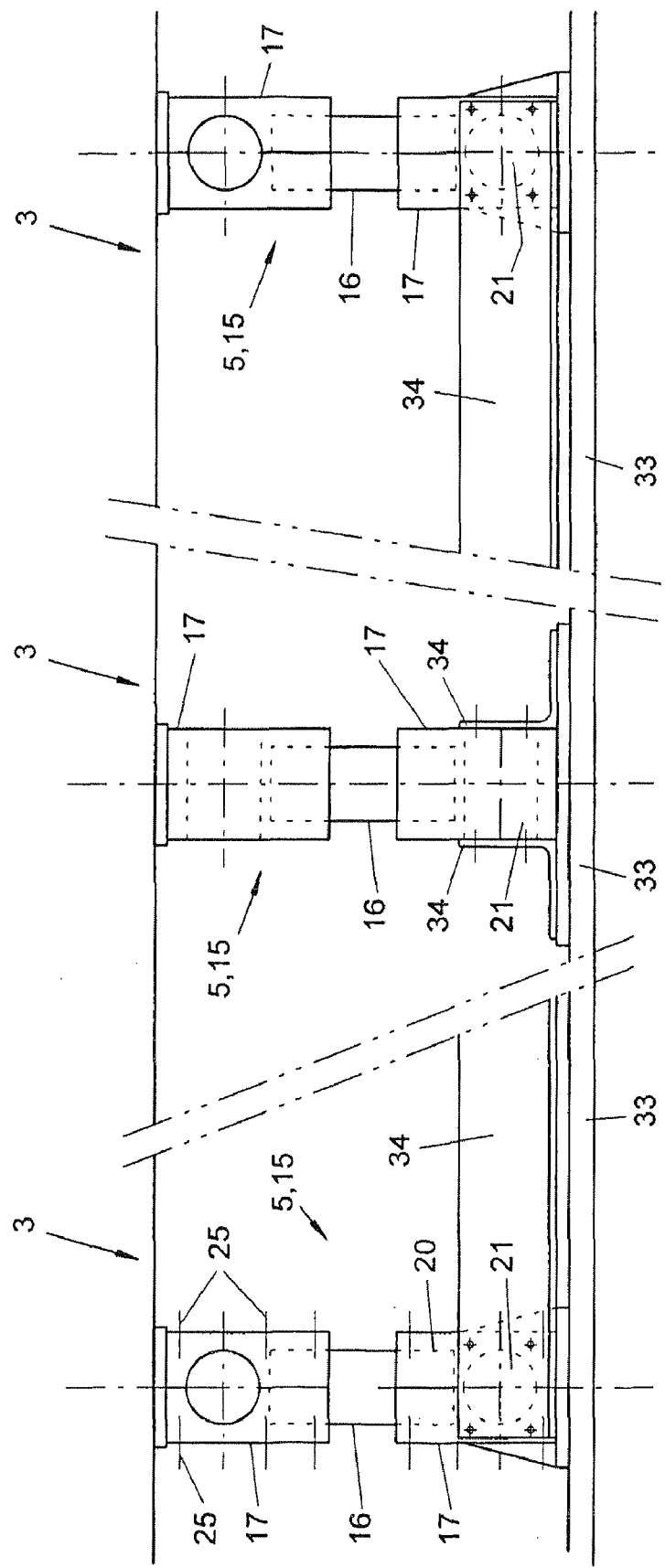

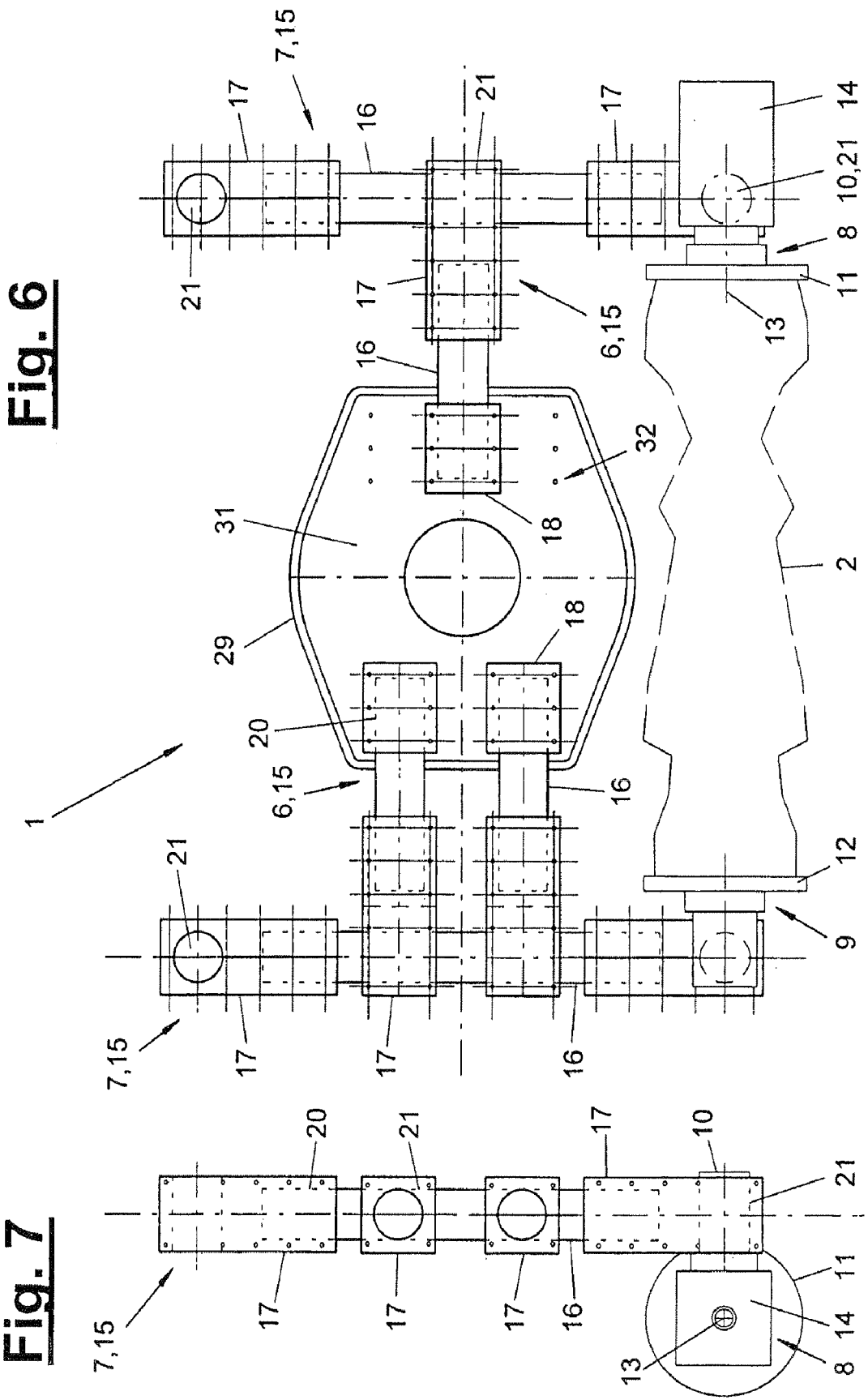

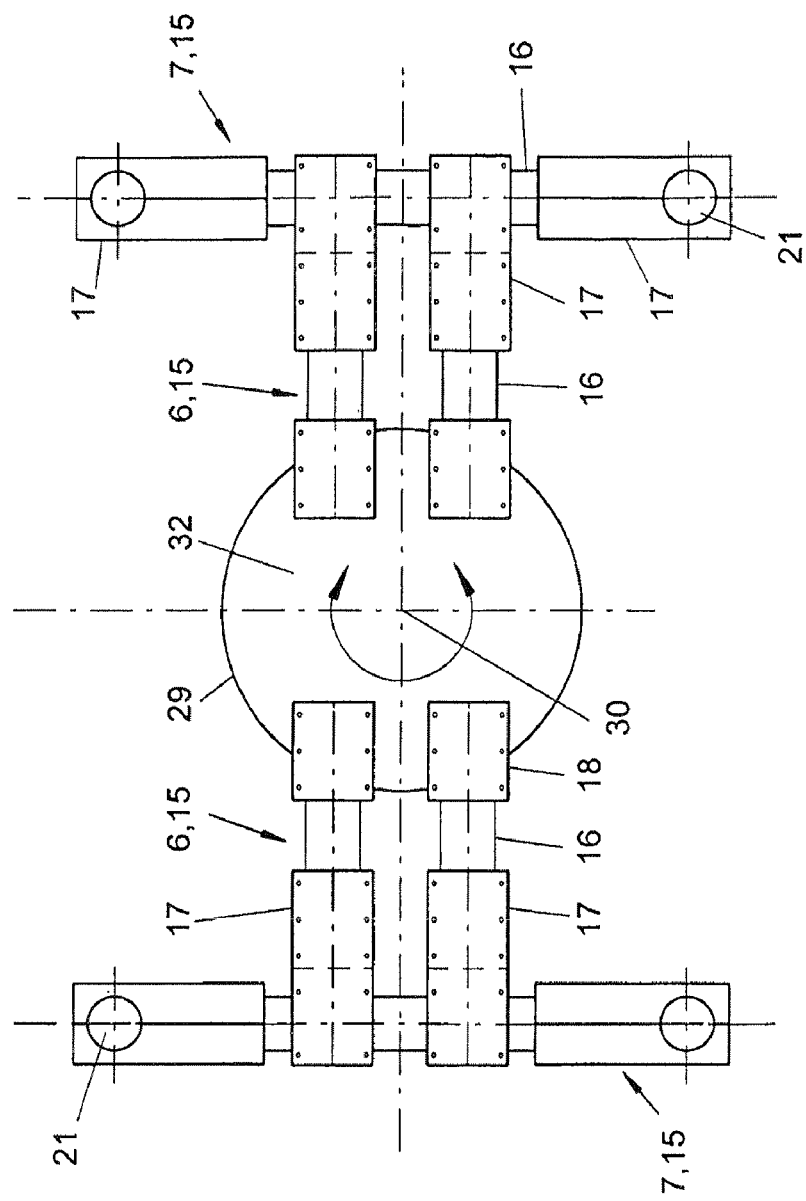
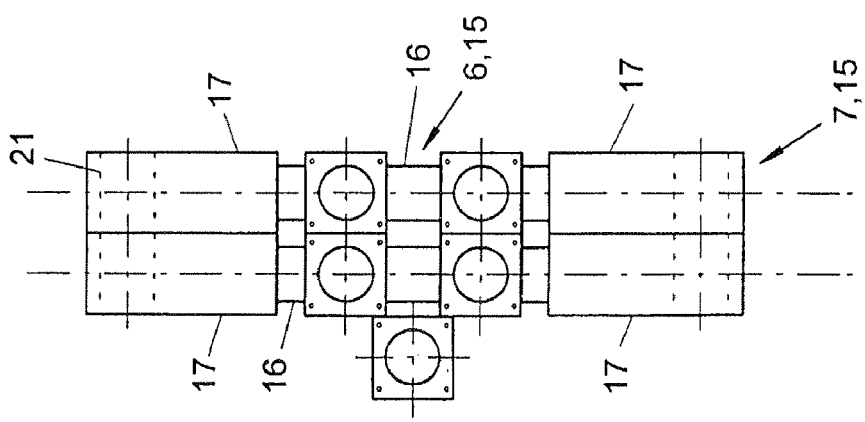

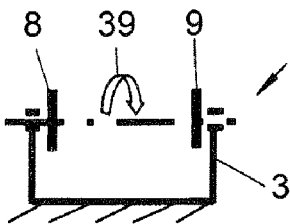
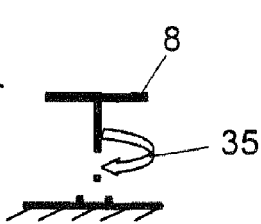
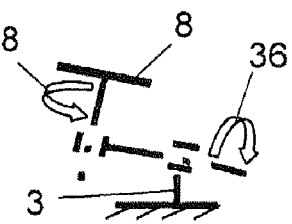
Fig. 15     Fig. 16     Fig. 17
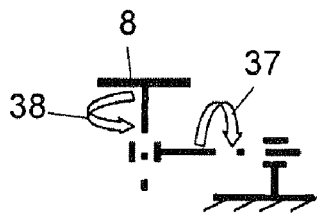
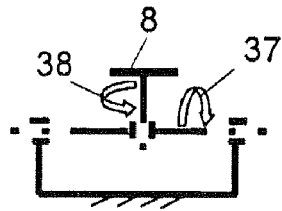
Fig. 18     Fig. 19
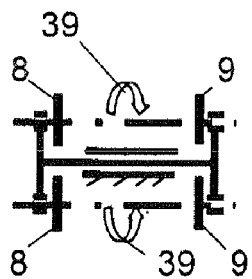
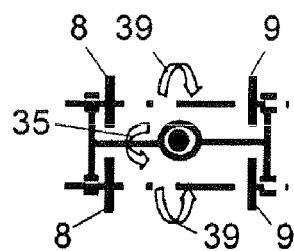
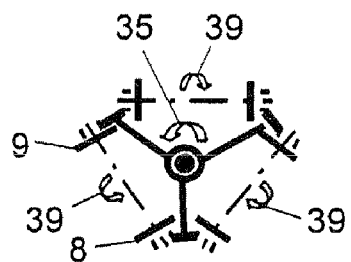
Fig. 20     Fig. 21     Fig. 22
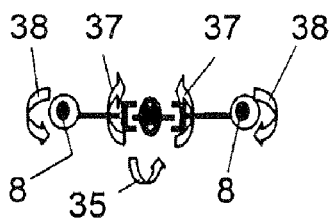
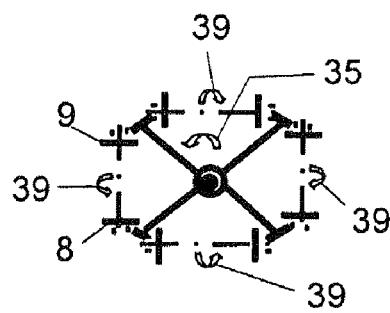
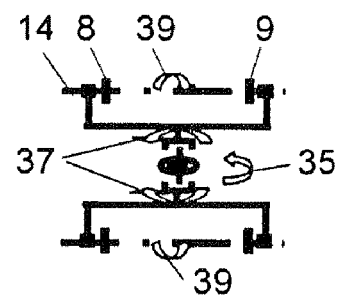
Fig. 23     Fig. 24     Fig. 25

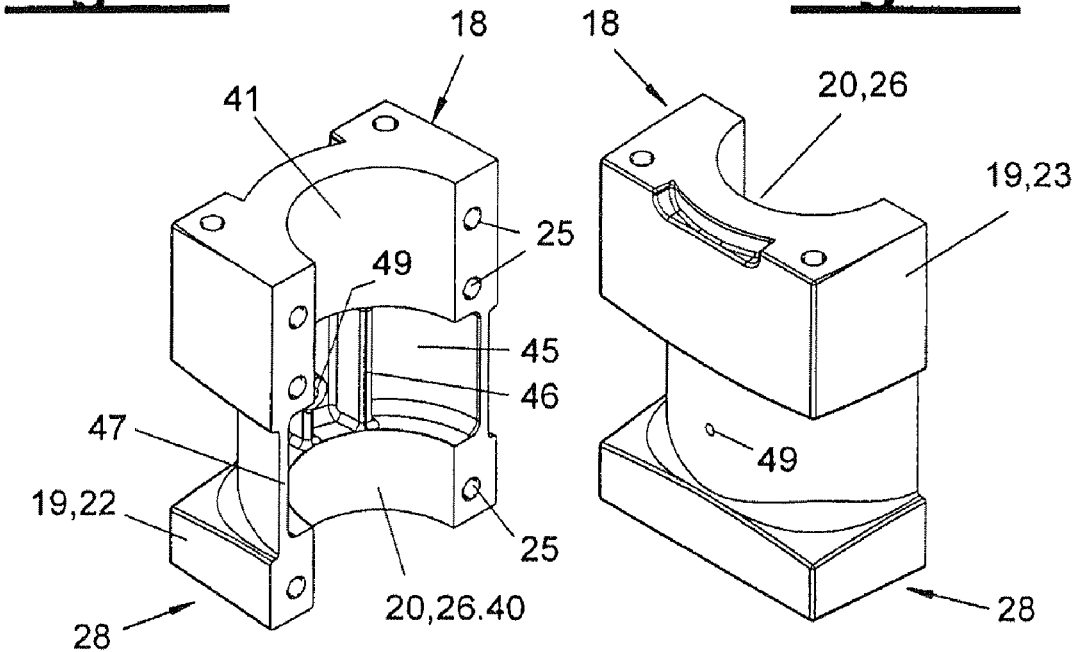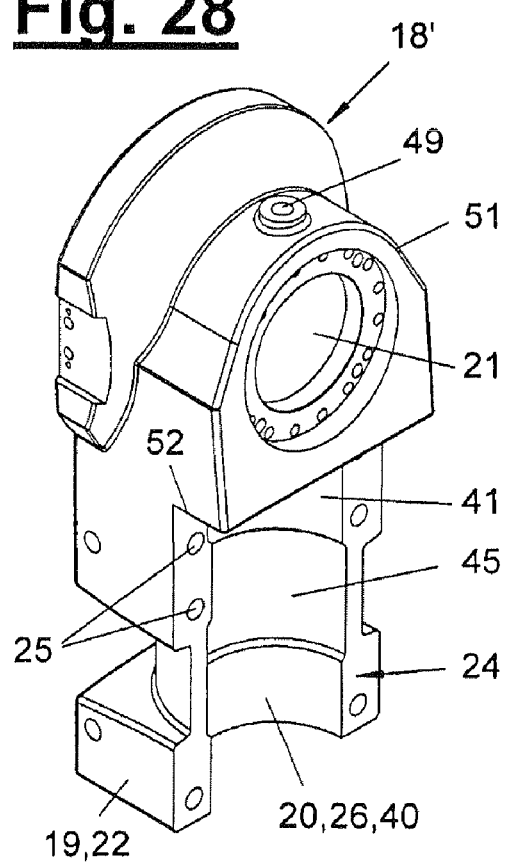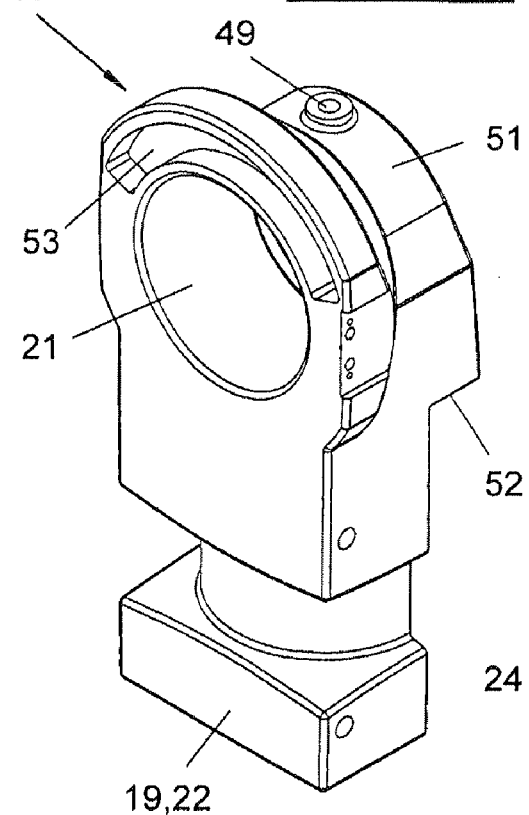

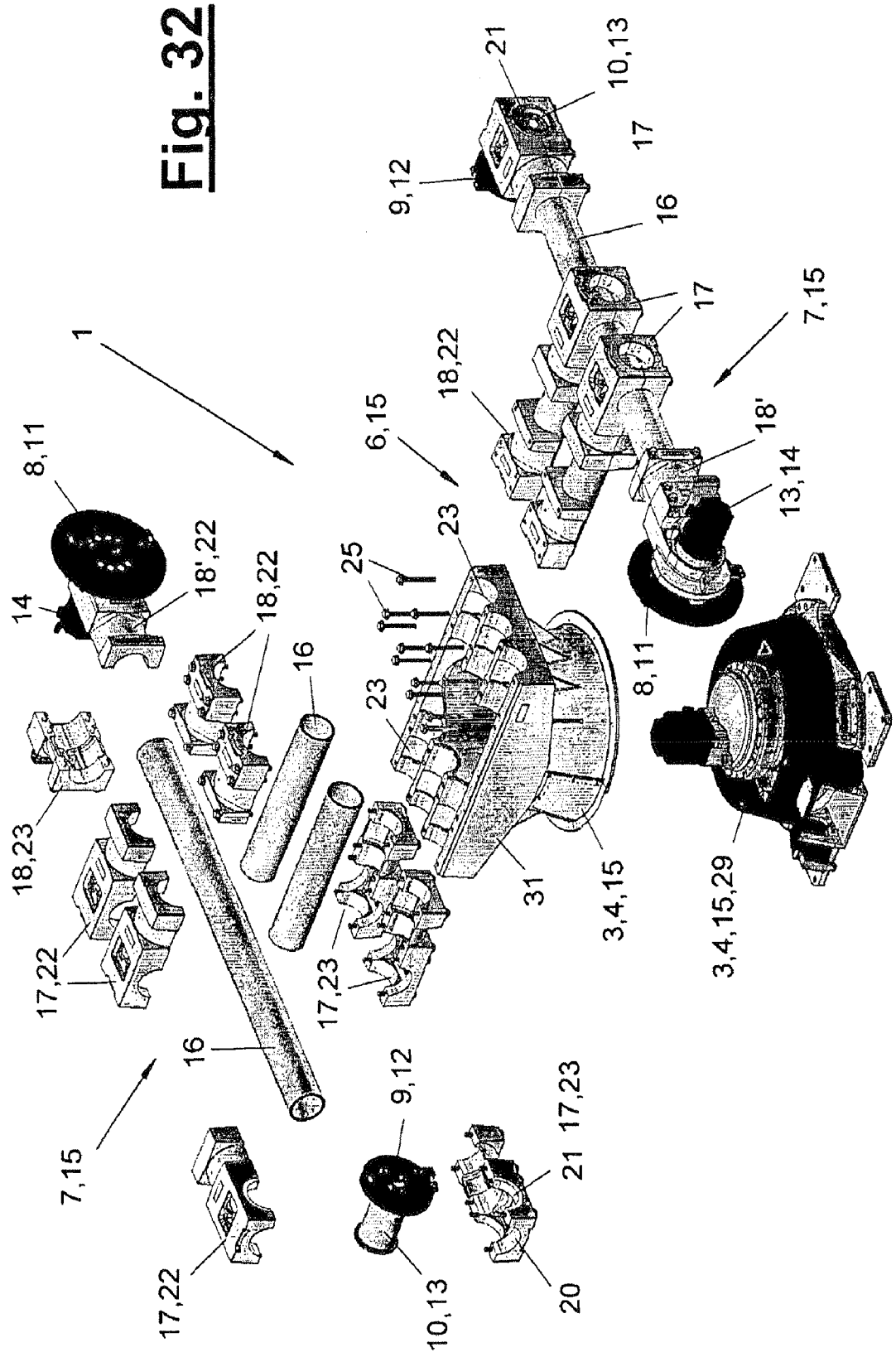

US 8,118,291 B2

WORKPIECE POSITIONING DEVICE

The invention relates to a workpiece positioning device having a machine frame and the features in the generic term of the main claim.

Such workpiece positioning devices are known from practice. These may be for example rotary positioning devices, turning positioning devices or the like. The known workpiece positioning devices have a rigid machine frame, usually of welded construction, on which one or more workpiece receiving elements are rigidly or movably situated, or possibly with an additional drive. The known designs have a high weight and are bulky and expensive.

DE 35 26 076 C2 and DE 85 21 054 U1 show an industrial robot system with an upright processing robot and one or more surrounding workpiece positioning devices. The workpiece positioning devices are conventional in their construction, with a solid machine frame.

The object of the present invention is to show an improved workpiece positioning device.

The invention solves this problem with the features in the principal claim.

The modular machine frame has the advantage that the workpiece positioning device is constructed according to a building block system and can be adapted to a great variety of needs. Because of the modular form of construction, the workpiece positioning device can also be refitted as needed and its dimensions can be changed. The modular design permits construction of a great variety of types of workpiece positioning devices with different positioning axis configurations from a large number of modular elements, in particular carrier elements and connection elements. This significantly reduces the costs of the machine frame and of the complete workpiece positioning device.

The size dimensions of the machine frame can be varied by choosing carrier elements of different lengths. In this case, subsequent changes are also possible by exchanging or shortening the carrier elements. Different weight requirements can also be taken into account by means of reinforced frame modules, all of which have multiple arrays of carrier elements and connection elements. Here too, subsequent changes and adaptations are possible. When changing workpieces, existing equipment can also continue to be used by retooling.

The connection elements are preferably in the form of longitudinally divided clamping sleeves. The clamp connection has the advantage that the frame construction or assembly can take place as a cold process, in which warpage that was usual in previous welded designs is avoided. The clamp connections also allow subsequent modification of the machine frame. The clamping sleeves, which are preferably designed as T connectors, have the advantage here that on the one hand they are suitable for cross connection of carrier elements, and on the other hand can also produce the junction point to the workpiece receiving elements, and if necessary also to other parts of the machine frame, such as base plates, support feet or the like.

The subordinate claims specify additional advantageous embodiments of the invention.

Figure 2:
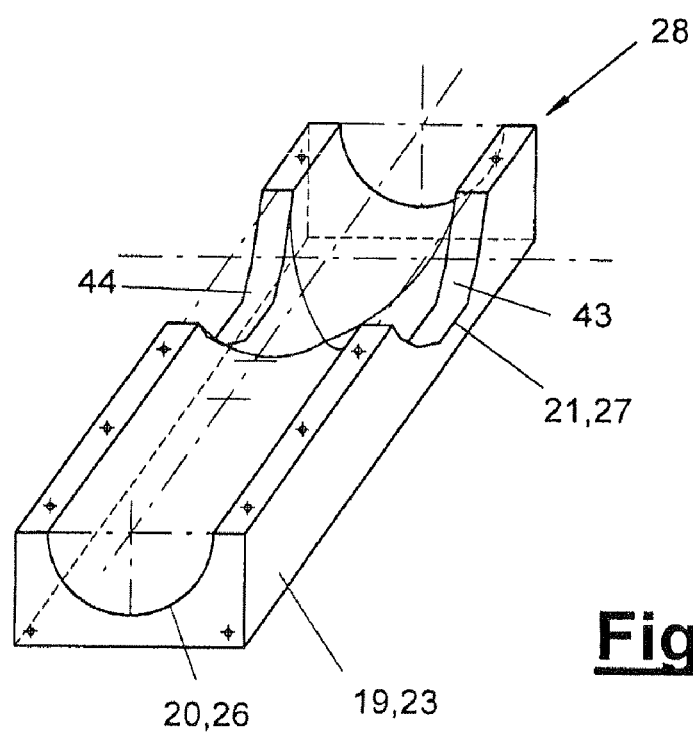
Figure 10:
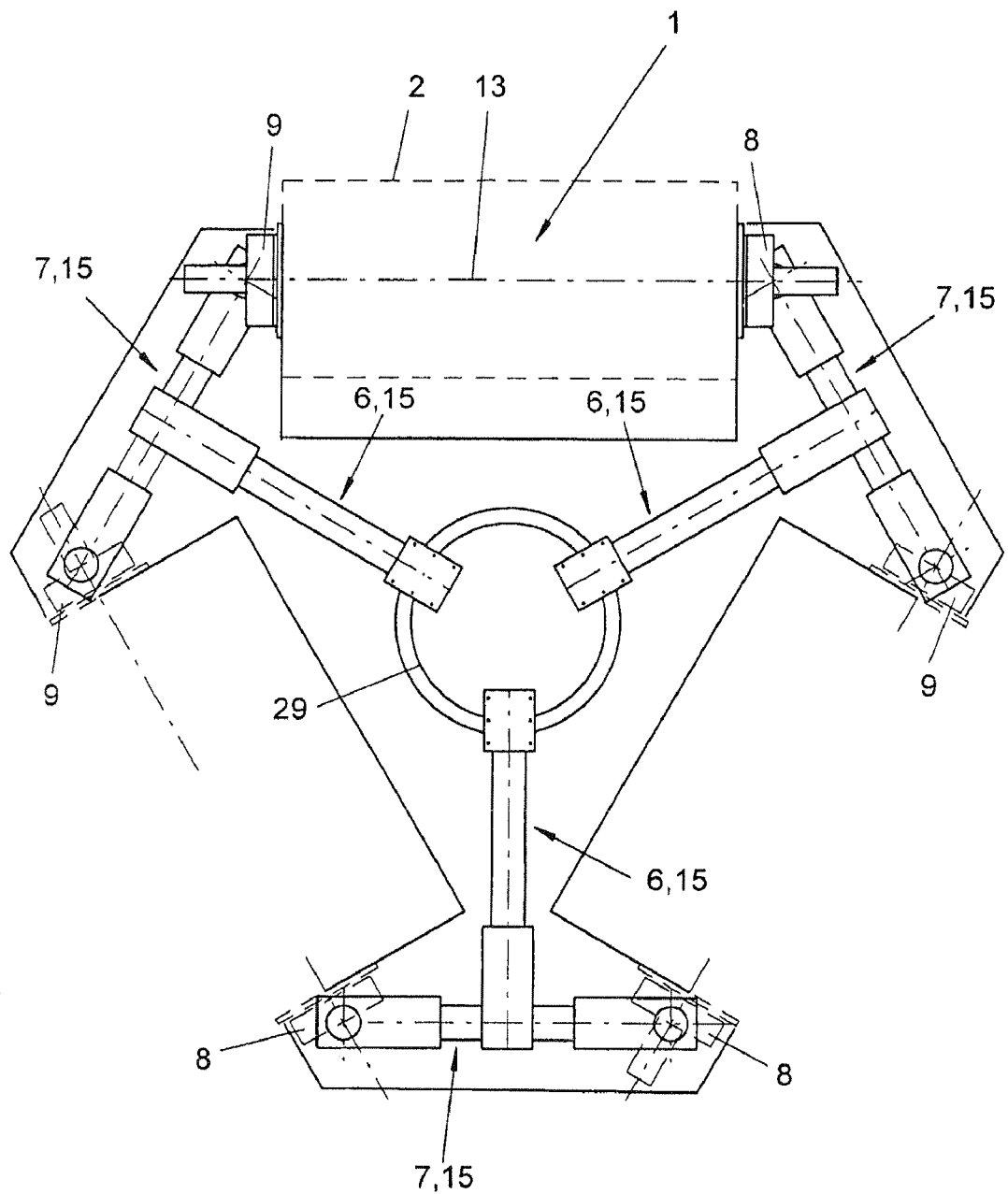

The invention is depicted in the drawings in exemplary and schematic form. The figures show the following details:

FIG. 1: a frame module with clamping sleeve and carrier element in side view;

FIG. 2: a perspective depiction of the lower clamping shell of the clamping sleeve;

FIGS. 3-5: a modular frame foot in disassembled representation and in three rotated views;

FIGS. 6-7: a modular machine frame of a workpiece positioning device in top view and rotated side view;

FIGS. 8-9: a machine frame variant in top view and rotated side view;

FIG. 10: another variant of a modular machine frame in top view;

FIGS. 11-14: various modular workpiece positioning devices in various views;

FIGS. 15-25: various schematic depictions of kinematic and construction variants of workpiece positioning devices;

FIGS. 26-31: three construction variants of clamping sleeves in perspective views;

FIG. 32: a workpiece positioning device in exploded view; and

Figure 33:
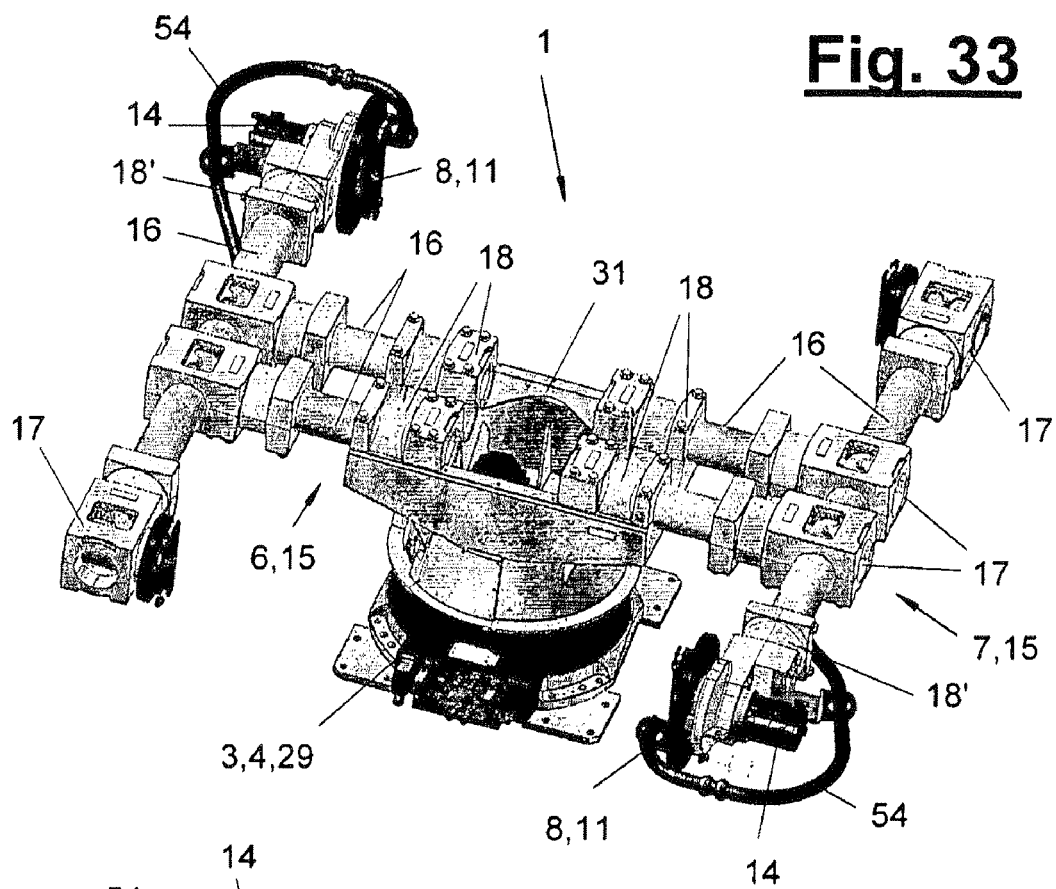
Figure 34:
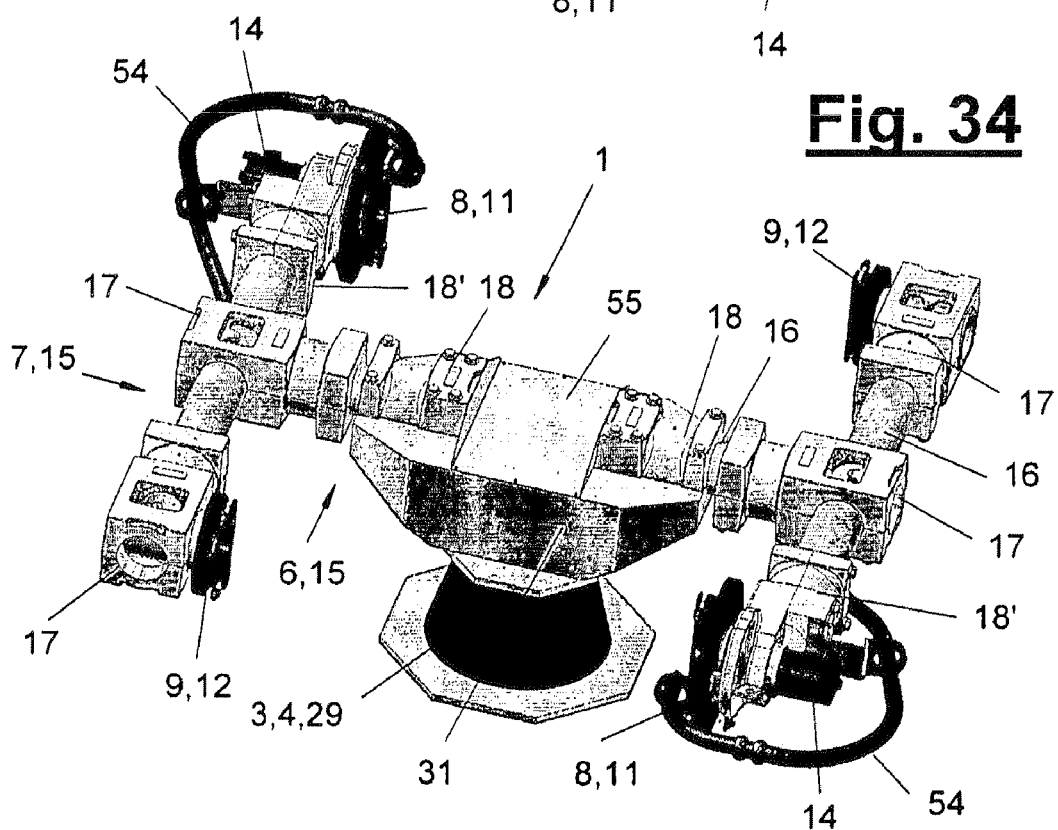

FIGS. 33-34: two construction variants of a workpiece positioning device in perspective views.

The invention relates to workpiece positioning devices (1) having one or more preferably rotational, preferably driven positioning axes (35 through 39) for positioning one or more workpieces (2) as needed. Alternatively, the positioning axes (35 through 39) may be linear or combined rotational/linear axes.

According to the schematic depictions of FIGS. 11 through 25 and 32 through 34, such workpiece positioning devices (1) may be for example turning positioning devices, rotary positioning devices, rotary-turning positioning devices or tilt positioning devices or the like for one or more workpieces (2). The workpiece positioning devices (1) enable the workpieces (2) to be brought via the positioning axis/axes (35 through 39) into a suitable position to be worked on, and if necessary even to be moved during the working process. For example, during fusion welding the workpieces can be guided and moved by the workpiece positioning devices (1) in coordination with the welding process in such a way that a downhand position always results at the welding location, which prevents unwanted runoff of the molten material. For example, the workpiece positioning device (1) may be connected with the control of a processing robot (not shown) as an external robot axis.

The workpiece positioning device (1) has a machine frame (3), stationary or possibly movable on one or more axes, on which one or more workpiece receiving elements (8,9) for workpieces (2) are rigidly or movably situated. The movabilities of machine frame (3) and/or workpiece receiving element(s) (8,9) result in the positioning axis/axes (35 through 39).

The machine frame (3) is of modular design in the various embodiments, and comprises one or more frame parts (4,5,6,7). At least some of the frame parts (4,5,6,7) are of modular construction for their part, and have one or more frame modules (15). Aside from the modular frame parts (4,5,6,7), the machine frame (3) may also have other conventional frame parts, for example a support foot (29), a base plate (33) or the like. FIGS. 6 through 10 and 32 through 34 show such variants.

A frame module (15) is made up of several module elements (16,17,18) matched to each other. At the same time, a frame module (15) has at least one elongated carrier element (16) and at least one connection element (17,18). In the embodiments shown in FIGS. 1 through 10 and 32 through 34 there are at least two connection elements (17,18) assigned to each elongated carrier element (16), and they are located preferably at least at its ends. Cross connections to other frame modules (15) can be created through the connection elements (17). The connection elements (18') represent drive supports for the workpiece receiving element(s) (8,9).

The elongated carrier element (16) is designed for example as a rod or a pipe. It preferably has a straight shape, and alternatively can be curved. The carrier element (15) can have any cross section shape; it may be prismatic or rounded, for example. Preferably it is a cylindrical pipe with a circular cross section. The length of the carrier elements (16) can vary according to need.

The individual connection element (17,18,18') is designed for example as a clamping sleeve (19), which may be detachably connected to one or more carrier elements (16). In the one version the connection element (17) is implemented as a T connector, and permits cross connections of carrier elements (16). It can also serve to receive the support or axis (13) of a workpiece receiving element (8,9). The other connection element (18) represents a shortened version of the forenamed embodiment, and offers only one longitudinal connection. In its function as a drive support the connection element (18') serves to receive a drive (13) for a workpiece receiving element (8,9). In addition, connectors of any other shape are possible, for example cross connectors. They also do not have to be in the form of clamping sleeves, but may be plain couplers or other such designs.

In the two variants shown, the clamping sleeve (19) has at least one longitudinal channel (20) to receive a carrier element (16). In the preferred embodiment the longitudinal sleeve (19) has only one longitudinal channel (20). As a variation thereof, multiple arrangements are possible. In the variant with the T connector (17) the clamping sleeve has at least one longitudinal channel (20) and at least one transverse channel (21) to receive a plurality of carrier elements (16). The transverse channel (21) here is situated off center when viewed in the longitudinal direction, and is located at a sleeve end (28). The central axes of the longitudinal channel (20) and the transverse channel (21) intersect each other at a right angle. The off-center and end-positioned situation of the transverse channel (21) offers sufficient insertion depth and guide length for the carrier element (16) received in the longitudinal channel (20). Alternatively, a centered situation of the transverse channel (21) is possible.

The clamping sleeve (19) can be opened. It is of divided design for this purpose, and is preferably divided centrally and longitudinally. This results in two homogeneous bowl-shaped clamp parts (22,23). One of these is shown in perspective view in FIG. 2. FIGS. 26 through 31 show other construction variants. The clamping shells (22, 23) have longitudinal and transverse grooves (22, 23) to form the longitudinal and transverse channels (20,21). The shapes of the channels (20, 21) and the grooves (26,27) are adapted to the external contour of the carrier elements (16), and preferably bear closely there against mating surfaces or ring surfaces. When the external contours of the carrier elements (16) are round, there are interruptions in the abutment and contact area in the area where the channels (20,21) cross.

The clamping shells (22,23) are detachably joined with each other at the separation point (24) by means of clamp connectors (25), and in a clamped fit with the surrounded carrier element (16) transversely to the separation point or separation slit (24). The clamp connectors (25) are for example screw fittings. These may be screw fittings in the shells, where one clamping shell (22) has through bores and the other clamping shell (23) has threaded bores in the shell wall on both sides of the grooves (26,27). Alternatively, there are through screw fittings with through bores present on both clamping shells (22,23), which permit a connection of the clamping sleeve (19) with the substrate or with other parts.

FIGS. 26 through 31 clarify the construction of the connection elements (17,18) and of the drive support (18') and its sleeve design in detail. The longitudinal and transverse channels (20,21) or the longitudinal and transverse grooves (26, 27) can be subdivided into two, three or more ring-shaped or half-ring-shaped support surfaces (40 through 44) having the same or different width, which are separated from each other by recesses (45) between them. The support surfaces (40 through 44) form more exact bearing surfaces than a continuous groove (26,27). In the recesses (45), ribs (46) running in the longitudinal direction can be formed to stiffen the shell walls (47), which are also thinned in this area by removal of material on the outside. At the support surfaces (40 through 44) the wall thickness is dimensioned according to the necessary supporting and holding forces. The clamp connectors (25) are also located here.

The shortened connection element (18) shown in FIGS. 26 and 27, which depicts what is called an i shell, has two support surfaces (40,41). The T connector (17) shown in FIGS. 30 and 31 has three support surfaces (40,41,42) in the longitudinal channel (20) and two support surfaces (43,44) in the transverse channel (21). In addition, the outside sleeve wall can show a penetration (48) at the crossing point. Weight can be saved thereby, exactly as with the recess (45). Furthermore, cables and lines can be run in the carrier elements (16) and can be led outside at the penetration (48).

The drive support (18') shown in FIGS. 28 and 29 comprises a support head (51) with an adjoining clamping shell (22) which is designed in conformity with the bowl shape of the shortened connection element (18), and which is also augmented and connected with such a clamping shell (23) of the shortened connection element (18) to form the closed clamping sleeve (19). The support head (51), preferably in a single piece, contains a transverse channel (21) to receive the rotational axis (13) and an associated cylindrical fitting or neck (10) of the one driven workpiece receiving element (8). On the front of the support head (51) there is a curved guide (53) for a rotation limiter which may be present on the adjacent workpiece receiving element (8). The purpose of this is to protect process fluid supply lines (54) for the drive (14). FIGS. 33 and 34 make this arrangement clear. On the back side of the support head (51), on the transverse channel (21), it is possible to flange mount the drive, which comprises for example a controllable electric motor and a gear unit which may be connected ahead.

The exact mutual positioning of the carrier elements (16) and connection elements (17,18) or of the drive support (18') can be achieved for example by means of set-through positioning pins. The clamping shells (22,23) can have suitable receiving openings (49). In the area of a penetration (48) there may also be a holding nose (50) with such a receiving opening (49), which protrudes into the opening. The two carrier elements (16) inserted crosswise can be positioned using the double receiving opening (49) on the T connector (17).

The clamping sleeve (19), whose external contour is essentially rectangular, can have additional connecting possibilities on the flat side walls and/or end walls, for example screw holes. In this case the walls can form mounting or connection surfaces, or may contain such defined areas, possibly spatially limited.

The connection elements (17,18) can all be of the same design, and can be placed and used wherever desired. Preferably, the carrier elements (16) are also all the same, at least in their cross sectional shape. They can vary in length in the manner described earlier. Otherwise different connecting elements can also be used, for example T connectors, cross connectors, longitudinal connectors etc.

One or more workpiece receiving elements (8,9) may be situated on the machine frame (3). The workpiece receiving elements (8,9) may have one or more axes of motion, e.g. rotational axes (13), to form a positioning axis (38,29)

according to the construction variants of FIGS. 15 through 25. They may hold one or more workpieces (2), floating on one side or held on both sides.

The machine frame (3) for its part may have one or more movable positioning axes (35,36,37) in the form of rotational and/or tilting axes with appropriate controllable drives (not shown). Different kinematics result for the workpieces (2), depending on the nature and number of the axes of motion of the workpiece receiving elements (8,9) and of the machine frame (3). FIGS. 15 through 25 show different exemplary embodiments for this.

FIGS. 3 through 5 depict a modular frame part (5) in the form of a column, detached. A plurality of instances of the column (5) may be present, each consisting of one or more frame modules (15). In the embodiment shown there are one vertically oriented carrier element (16) and two T connectors (17) present, which receive the ends of the carrier element (16) in their longitudinal channels (20). The height of the column is set by means of the length of the rod. Cross connections, which form transverse arms or transverse feet for example, can be created via the transverse channels (21). In the short remnant of the longitudinal channels (20), closing plugs, supporting plates etc. with corresponding pins or projections may be affixed in the clamping closure.

The columns (5) can be attached in various ways to a base plate (33) or directly to some other substrate. In the embodiment shown, the lower T connectors (17) are standing with their front ends (28) butted on the base plate (33). For attachment there are mountings (34) present on both sides, for example angle beams, which are firmly attached on the one hand to the base plate (33) and on the other hand to the T connector (17), for example bolted on. The angle beams (34) can connect two or more columns (5) and form an elongated foot. On the lower T connectors (17) there may also be setting aids engaged or present (not shown) for positioning the machine frame (3) exactly.

FIGS. 6 through 9 and 32 through 34 show a workpiece positioning device (1) whose machine frame (3) has for example an upright support foot (29) and modular frame parts (6,7) in the form of longitudinally oriented and transversely oriented frame arms. The frame arms (6,7) are oriented transversely to the axis of the supporting foot and are situated for example horizontally. In the lower half of the image in FIGS. 6 and 7 the arrangement of workpiece receiving elements (8,9) and of a workpiece (2) on the machine frame (3) is also shown schematically. FIGS. 32 through 34 also show the workpiece receiving elements (8,9).

The supporting foot (29) has a mounting head (31) on its top side, on which the modular frame parts (6,7), in particular the longitudinally oriented frame arms (6), may be removably attached. This can be done by means of the clamp connectors (25) or screw fittings which are present anyway.

In the variant in FIGS. 6 through 8 the mounting head (31) is designed as a flat mounting plate, to which complete connecting elements (18) are attached. A mounting grid (32) of a plurality of threaded holes may be present on the mounting plate (31) for this purpose, these threaded holes being present in the same grid as on the connecting elements (1,18).

In the variant in FIGS. 32 to 34 the mounting head (31) already has lower clamping shells (23) formed on its top side, which are completed with upper clamping shells (22) of the shortened connecting elements (18) and joined by means of clamping devices (25). According to FIG. 32, the mounting head (31) may have a plurality of clamping shells (23) side by side, which are occupied as needed according to FIGS. 33 and 34. The unoccupied clamping shells (23) and the hollow interior of the mounting head (31) can be closed with an appropriate covering (55).

The left and right halves of FIG. 8 show different variants in the design of a longitudinally oriented frame arm (6). In the right half of the picture the latter consists of a single frame module with a carrier element (16) and two connection elements (17,18). The left half of the picture shows a double arrangement of two frame modules (15) situated side by side. This multiple arrangement offers greater loading capacity and stability. Thanks to the assembly grid (32), both variants can optionally be attached to the support foot (29) or to the assembly plate (31). FIGS. 33 and 34 also show the one-armed and two-armed implementations.

For connecting the carrier elements (16) to the support foot (29), the shortened connection elements (18) mentioned at the beginning may be used as pure longitudinal connectors, or the T connectors (17) may be used. The shortened connection elements (18) have only the longitudinal channel (20), no transverse channel (21). In the case of the clamping sleeve (19) that is divided horizontally and in the middle, on each side there are three clamp connectors that are oriented transversely to the separation point; they are preferably provided here as through screw fittings for connecting with the mounting grid (32) and the latter's threaded holes.

The connection elements or T connectors (17) located at the other end of the rod receive in their transverse channels (21) a rod (16) that has been pushed through, at each end of which a T connector (17) is situated in a position rotated by 90°. Because of this rotation, its transverse channels (21) face upward. The carrier element (16) that has been pushed through and its connection elements (17) form the transverse frame arm (7).

The workpiece positioning device (1) shown in FIGS. 6 and 7 and FIGS. 32 to 34 represents a rotary positioning device for receiving two workpieces (2), which can be rotated around their longitudinal axes by means of the rotational axis (13) of the opposing workpiece receiving elements (8,9). In addition, the modular frame parts (6,7) can still be rotated around the vertical axis of the support foot (29) if necessary.

As made clear in the lower half of FIG. 6 and in FIGS. 32 through 34, the one workpiece receiving element (8) comprises a receiving piece (11), for example a mounting disk, which may be rotatably mounted around a horizontal rotational axis (13) and in addition is connected to the drive (14), for example a controllable electric motor (14). The drive (14) can be connected to the cell controller or to the robot controller of a processing robot.

The workpiece receiving element (8) has for example a fitting (10) which projects downward in FIGS. 6 and 7 or to the rear in FIGS. 32 through 34, for example a closely fitting lug for positive guidance and clamping reception in the vertically or horizontally oriented transverse channel (21) of the corresponding T connector (17) or of the drive support (18'). Alternatively, the workpiece receiving element (8) can be attached to the side wall of the clamping sleeve (19), directly or through an intermediate plate; for example, it may be screwed on. The aligned opposite workpiece receiving element (9) also has a receiving part (12), and gets along with a freely rotatable support, which is also received by means of a fitting or lug in the transverse channel (21) of the corresponding T connector (17). The workpiece (2) may be removably attached to the receiving parts (11,12) in any suitable manner, directly or indirectly through a workpiece carrier or the like.

The two transverse arms (7) extend beyond the support foot (29) on both sides, and carry workpiece receiving elements (8, 9) of the previously described type on their free ends.

FIGS. 8 and 9 show a variant of the previously described workpiece positioning device (1) which is designed for higher loads and workpiece weights. The longitudinal arms (6) comprise multiple arrangements of frame modules, for example the quadruple arrangements shown, which are situated for example in pairs side by side and one above the other. In addition, FIG. 9 shows the variant that yet a fifth frame module (15) can be set on top. In addition, any other combinations of arms or modules are possible. The transverse arms (7) are also reinforced by multiple arrangements of frame modules (15), for example double arrangements. In the exemplary embodiment shown here, the support foot (29) is also provided with a rotational axis (30).

FIG. 10 shows a variant of a workpiece positioning device (1) for receiving three workpieces. In this case three modular longitudinal arms (6) are situated on a support foot (29) with base plate (33), distributed at uniform intervals around the circumference. They bear a modular transverse arm (7) on each of their free ends. The workpiece receiving elements (8,9) located at the ends of its arms work together with opposing receiving elements on a different transverse arm (7). Here too, the schematically indicated workpieces (2) can be rotated around the rotational axis (13) of the workpiece receiving elements (8,9). The support foot (29) may possibly have a vertical rotational axis. The frame modules (15) can be present in multiple arrangements for higher loads.

FIGS. 11 through 14 show various other module variants of the workpiece positioning device (1) and its machine frame (3).

Figure 11:
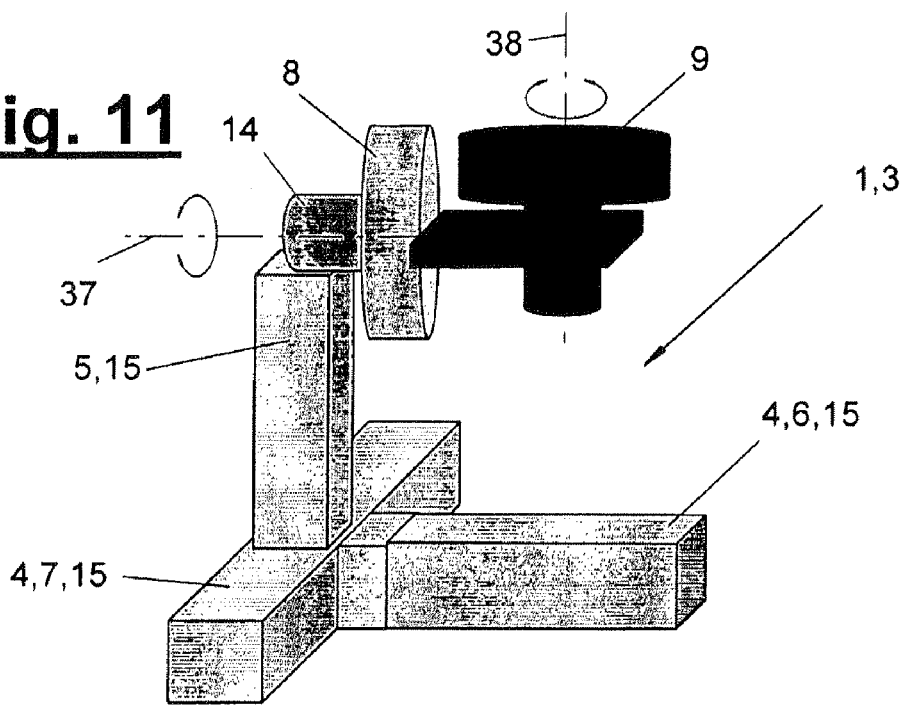

In FIG. 11 the machine frame (3) has an angled frame foot (4), which may be made of longitudinal and transverse arms (6,7) of the type shown in FIGS. 6 through 9 situated in a T shape. In addition, situated on the transverse arm (7) there may also be an upright (5) which is designed according to FIGS. 3 through 5. At the upper end of the column is a workpiece receiving element (8), which in turn carries a second workpiece receiving element (9) onto which the workpiece (not shown) is removably attached. The workpiece positioning device (1) shown here represents a rotary tilting positioning device with two orthogonal pivoting axes (37,38).

Figure 12:
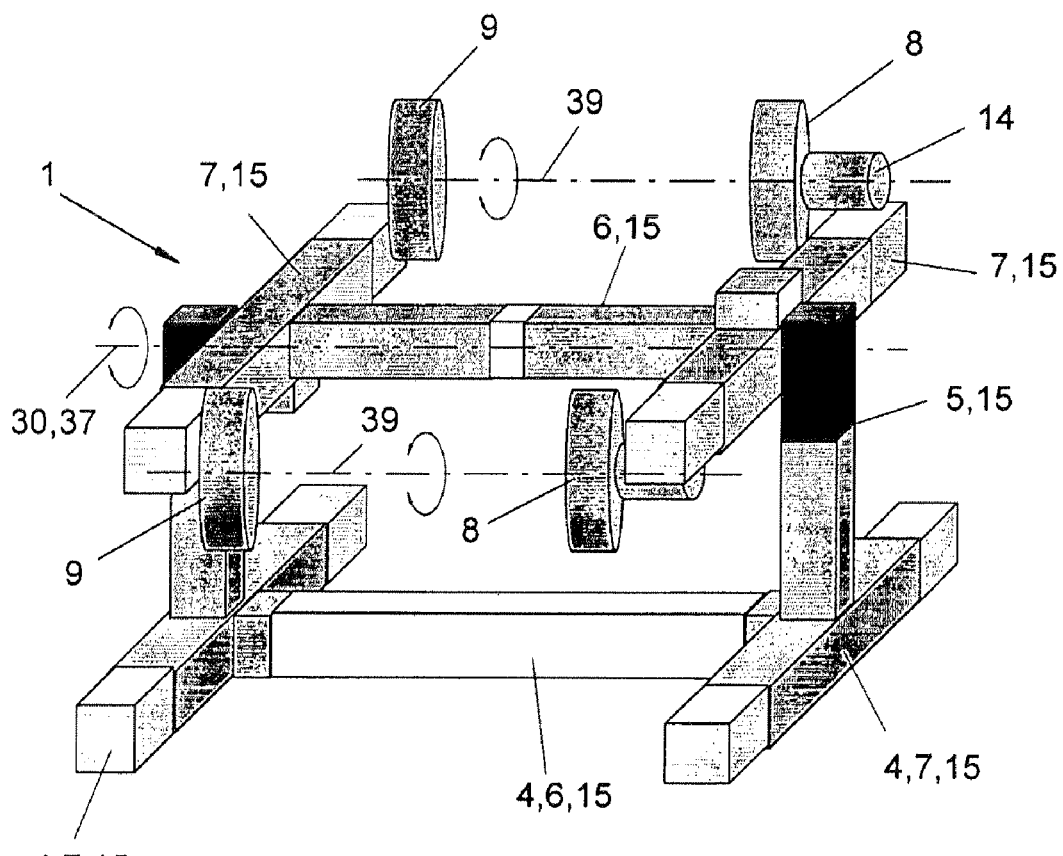

FIG. 12 shows a workpiece positioning device (1) in the form of a double turning positioning device with horizontal axis (30). Here the complete machine frame (3) is of modular construction. The frame foot (4) is H-shaped and is made up of modular longitudinal and transverse arms (6,7). By varying the length of the carrier elements (16), different foot sizes can be formed. Situated at the crossing points are two upright columns (5), which carry at their upper ends, rotatably mounted if appropriate, an arrangement of longitudinal and transverse arms (6,7) corresponding to FIGS. 6 through 9, having workpiece holders (8,9) attached on the ends to the transverse arms (7). The workpiece positioning device (1) has three parallel positioning axes (37,39).

Figure 13:
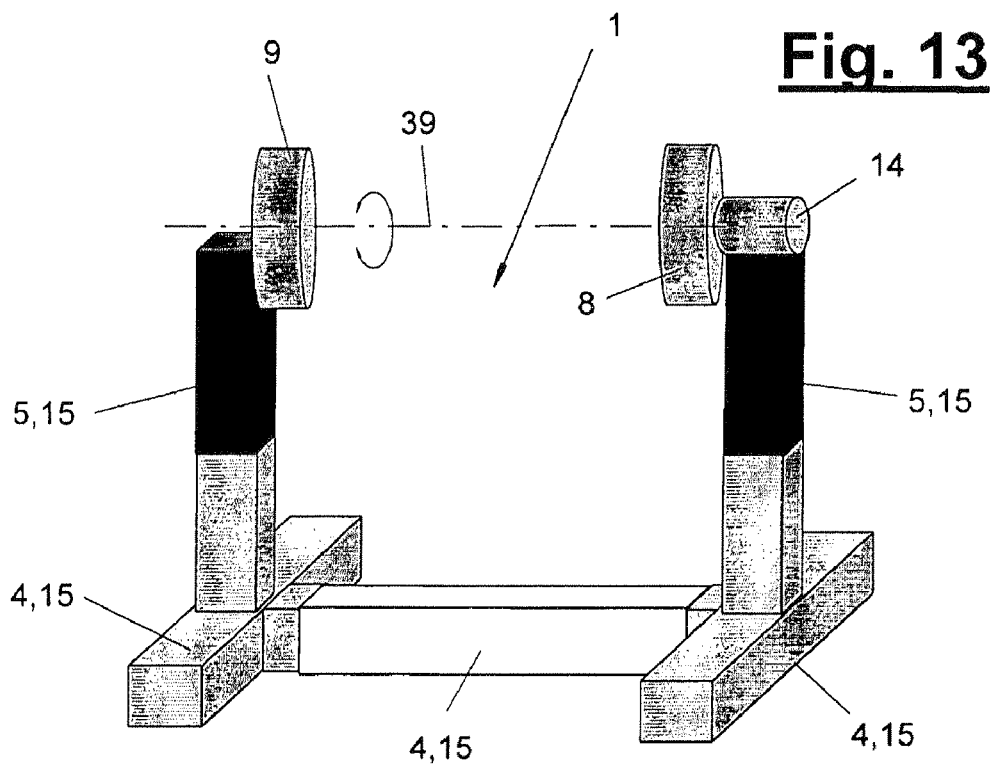

FIG. 13 shows a simple workpiece positioning device (1) in the form of a turning positioning device with one positioning axis (39). It has the previously mentioned H-shaped frame foot (4) with two upright columns (5), each of which carries on its upper end a rotatable workpiece receiving element (8,9).

Figure 14:
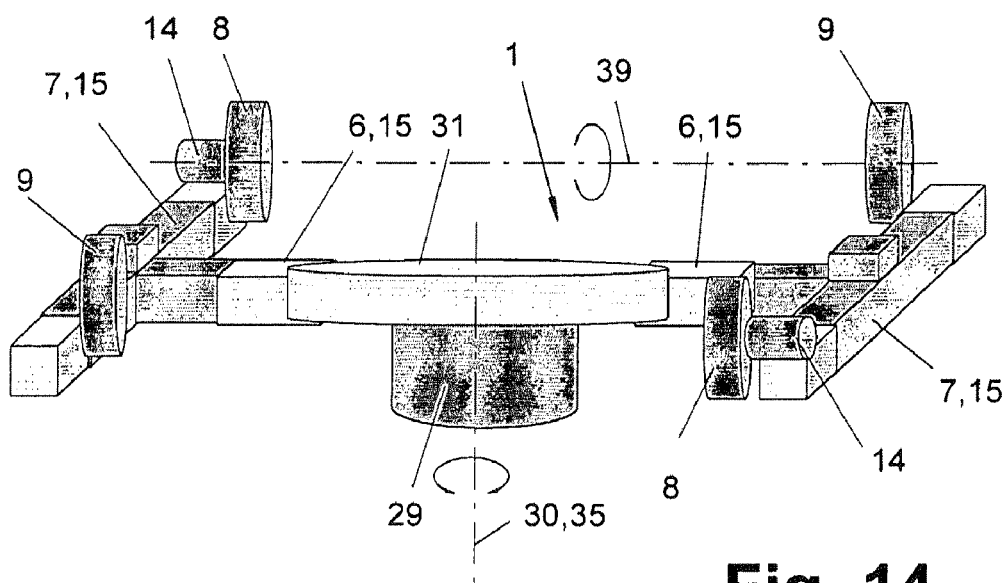
Figure 31:
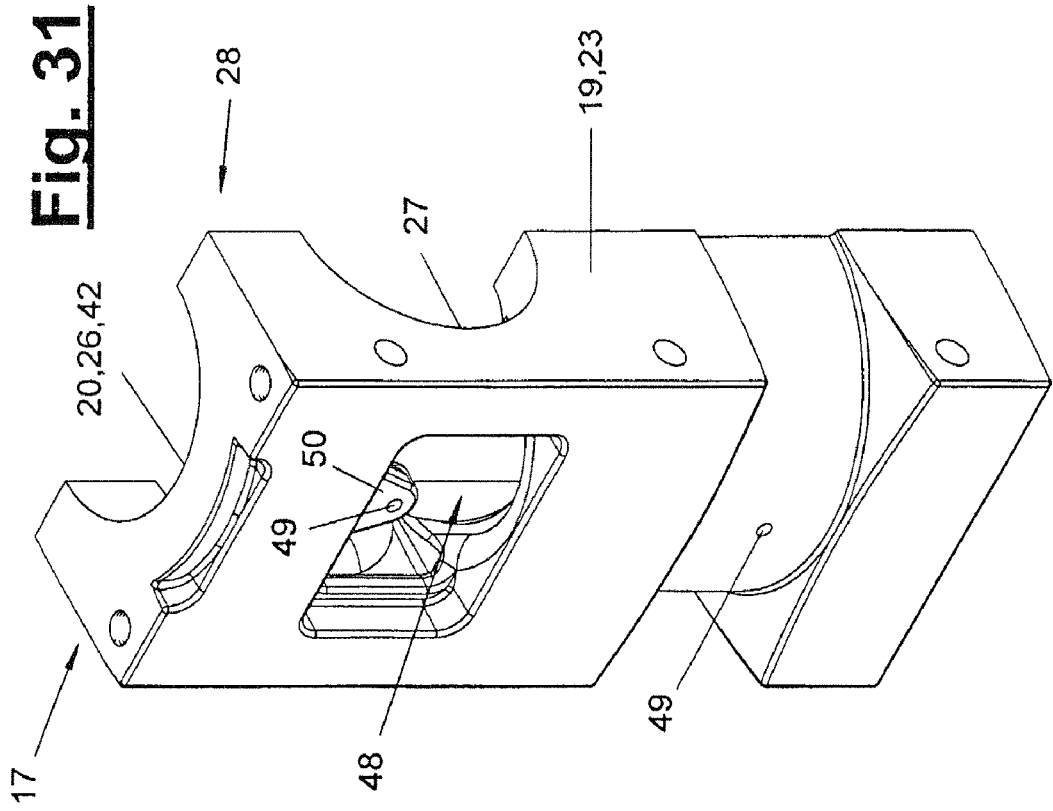
Figure 30:
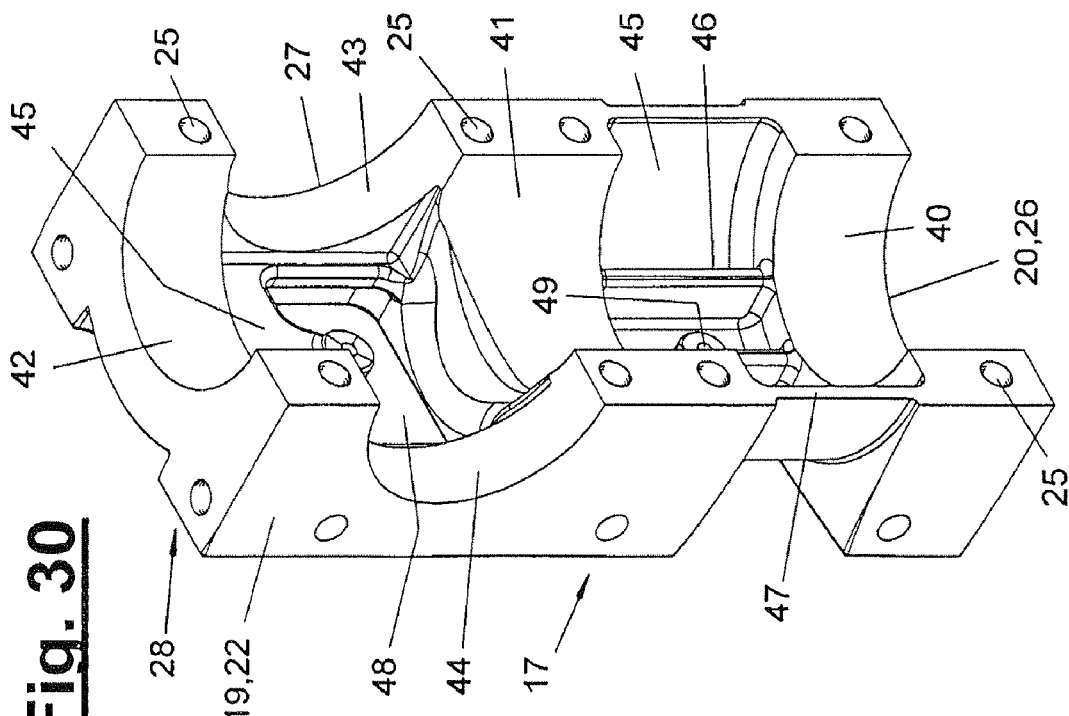

FIG. 14 depicts a double turning positioning device with vertical rotational axis (30). This corresponds to the embodiments depicted in FIGS. 6 through 9 and 32 through 34, and has three positioning axes (35,39).

FIGS. 15 through 25 show various basic kinematic variants of workpiece positioning devices (1) with a modular machine frame (3) and with up to five positioning axes (35 through 39).

In FIG. 15 a turning positioning device is indicated, corresponding to the previously described variant from FIG. 13. FIG. 16 shows a rotating table with a workpiece receiving element (8) and a single vertical rotational and positioning axis (35). The dual-axis (36,38) rotating table in FIG. 17 can in addition be tilted around a boom on an upright column. The other dual-axis (37,38) rotary table from FIG. 18 can additionally be swiveled around a horizontal boom. FIG. 19 shows a dual-axis (37,38) workpiece positioning device (1) in a combination of a rotary table with a turning positioning device The kinematic depiction of FIG. 20 belongs to a triple-axis (37,39) double turning positioning device according to FIG. 12 with a horizontal rotational axis (30). FIG. 21 shows a triple-axis (35,39) modification of this double turning positioning device with vertical rotational axis (30) corresponding to FIG. 14. FIG. 22 depicts the four-axis (35,39) kinematics of the triple turning positioning device shown in FIG. 10, with vertical rotational axis. FIG. 23 depicts a multiple-swivelable five-axis (35,37,38) rotating and turning positioning device with two rotary tables at the ends of horizontal swiveling arms, which in turn are rotatable around a central vertical column. FIG. 24 shows a five-axis (35,39) quadruple turning positioning device for four workpieces arranged crosswise. FIG. 25 shows a combined five-axis (35,37,39) rotating-turning positioning device with a central column having a vertical rotational axis, on which two side arms are situated so that they can swivel around horizontal axes; they in turn are designed as turning positioning devices.

Modifications of the illustrated embodiments in various ways are possible. This pertains to the engineering design of the carrier elements (16) and connection elements (17,18), which can have different types of releasable connections with positive fit and/or friction fit. In addition, the shape as well as the mutual positioning of the channels (20,21) may change. Aside from the different variants shown, any other modifications in the frame designs are possible.

REFERENCE LABELS 1 workpiece positioning device
2 workpiece
3 machine frame
4 frame part, frame foot
5 frame part, column
6 frame part, longitudinal frame arm
7 frame part, transverse frame arm
8 workpiece receiving element
9 workpiece receiving element
10 fitting, lug
11 receiving piece
12 receiving piece
13 axis, rotational axis
14 drive
15 frame module
16 module element, carrier element, rod, pipe
17 module element, connection element, T connector
18 module element, shortened connection element
18' module element, drive support
19 clamping sleeve
20 longitudinal channel
21 transverse channel
22 clamp part, clamping shell
23 clamp part, clamping shell
24 separation point
25 clamp connector, screw fitting
26 groove, longitudinal groove
27 groove, transverse groove 28 sleeve end, front end
29 support foot
30 rotational axis
31 mounting head, mounting plate
32 mounting grid
33 base plate
34 mounting, angle beam
35 positioning axis
36 positioning axis
37 positioning axis
38 positioning axis
39 positioning axis
40 support surface in longitudinal channel
41 support surface in longitudinal channel
42 support surface in longitudinal channel
43 support surface in transverse channel
44 support surface in transverse channel
45 recess
46 rib
47 shell wall
48 penetration
49 receiving opening for fitting pin
50 holding nose
51 support head
52 step
53 guide
54 process fluid supply line
55 cover

What is claimed is:

1. A workpiece positioning apparatus, comprising:
a base;
at least one elongate carrier element;
at least one connection element, each said connection element including at least one bearing configured to receive a respective carrier element;
a workpiece receiving member adapted to receive a workpiece thereon and having a first axis of rotation;
said workpiece receiving member selectively repositionably coupled to said base by said carrier element and said connection element to selectively change a position or orientation of said first axis of rotation;
a fastening member projecting into said bearing of said connection element and engaging said carrier element such that said carrier element is fixed relative to said connection element corresponding to the position or orientation of said first axis of rotation; and
a drive unit operatively coupled to said workpiece receiving member to drive said workpiece receiving member about said first axis of rotation.

2. A workpiece positioning device, comprising:
a first elongate carrier element; and
at least two connection elements selectively coupled to said first carrier element;
each of said first and second connection elements comprising:
a first shell half and a second shell half configured to be coupled together in confronting relation,
a first bearing surface defined by respective confronting portions of said first shell half and said second shell half, said first bearing surface defining a first space for receiving said first carrier element therein such that said first carrier element extends along a first axis, and
a second bearing surface defining a second space adapted to receive a second carrier element therein such that the second carrier element extends along a second axis that intersects and is orthogonal to said first axis.

3. The workpiece positioning device of claim 2, wherein said second bearing surface is defined by third and forth confronting portions of said first and second shell halves.

4. The workpiece positioning device of claim 2, wherein said second bearing surface is defined by an aperture through at least one of said first or second shell halves.

5. The workpiece positioning device of claim 2, wherein each of said first and second shell halves includes a groove extending along said first axis to define at least a portion of said first bearing surface.

6. The workpiece positioning device of claim 3, wherein each of said first and second shell halves includes a groove extending along said second axis to define at least a portion of said second bearing surface.

7. The workpiece positioning device of claim 2, further comprising:
an access port through at least one of said first and second shell halves and communicating with at least one of said first space or said second space.

8. The workpiece positioning device of claim 7, further comprising:
a projection extending across said access port and having an aperture therethrough with a longitudinal axis intersecting at least one of said first space or said second space for receiving a pin to facilitate positioning of said carrier element relative to said first bearing surface or said second bearing surface.

9. The workpiece positioning device of claim 2, further comprising:
a drive unit operatively coupled to one of said connection elements; and
a workpiece mounting operatively coupled to said drive unit and driven by said drive unit for rotation about one of said first axis or said second axis.

10. The workpiece positioning device of claim 2, further comprising:
a base supporting said carrier element and said connection elements thereon.

11. The workpiece positioning device of claim 10, wherein said base has an axis of rotation, said carrier element and said connection elements supported on said base for rotation about said axis of rotation.

12. The workpiece positioning device of claim 10, wherein said base defines said first shell half of at least one of said connection elements.

13. A workpiece positioning device, comprising:
a base;
at least one first connection assembly and at least one second connection assembly coupled to said base, each said first and second connection assembly comprising:
an elongate first carrier element having a first end and a second end,
a first shell half and a second shell half configured to be coupled together in confronting relation,
a first bearing surface defined by respective confronting portions of said first shell half and said second shell half, said first bearing surface defining a first space for receiving said first end of said carrier element therein such that said carrier element extends along a first axis, and
a second bearing surface defining a second space for receiving the second end of a respectively coupled second carrier element therein such that the second carrier element extends along a second axis that intersects and is orthogonal to said first axis;
a drive unit operatively coupled to one of said first connection assemblies; and a workpiece receiving member operatively coupled to one of said first or second connection assemblies and arranged in spaced, confronting relation to said drive unit for receiving a workpiece therebetween.

14. The workpiece positioning device of claim 13, wherein said first connection assembly and said second connection assembly are coupled to said base by first and second connection elements, respectively, each said connection element comprising:
   a third shell half and a fourth shell half configured to be coupled together in confronting relation, and
   a third bearing surface defining a third space for receiving the second end of one of said first or second carrier elements therein, said third bearing surface defined by respective confronting portions of said third shell half and said fourth shell half.

15. The workpiece positioning device of claim 13, wherein said base has an axis of rotation, said first connection assembly and said second connection assembly supported on said base for rotation about said axis of rotation.

* * * * *